F. M. WALLER.
MECHANICALLY PROPELLED PLOW.
APPLICATION FILED SEPT. 27, 1917.

1,383,251.

Patented June 28, 1921.

INVENTOR
F. M. Waller.
Per Robert F. Phillips
Attorney

UNITED STATES PATENT OFFICE.

FRANCIS MARK WALLER, OF STAFFORD, ENGLAND.

MECHANICALLY-PROPELLED PLOW.

1,383,251.           Specification of Letters Patent.       Patented June 28, 1921.

Application filed September 27, 1917. Serial No. 193,534.

(GRANTED UNDER THE PROVISIONS OF THE ACT OF MARCH 3, 1921, 41 STAT. L., 1313.)

*To all whom it may concern:*

Be it known that I, FRANCIS MARK WALLER, a subject of the King of Great Britain and Ireland, residing at 11 Brunswick Terrace, Stafford, in the county of Stafford, England, have invented certain new and useful Improvements in Mechanically - Propelled Plows, of which the following is a specification.

This invention relates to plowing implements in which two gang plows one a right-handed one and the other a left-handed one are carried by a single frame said plows being adapted to be used alternately, and it has for its object an improved implement which enables gang plows to be employed each of which will plow a strip approximately equal to the width of the frame of the implement. A further object is to reduce the overall length of the implement so as to enable same to be turned on a headland of minimum width.

Figure 1:
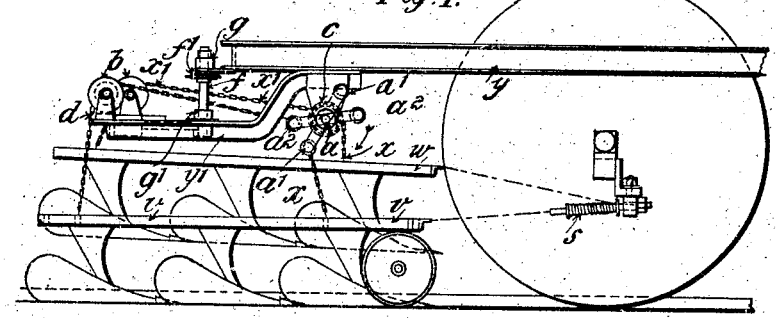
Figure 2:
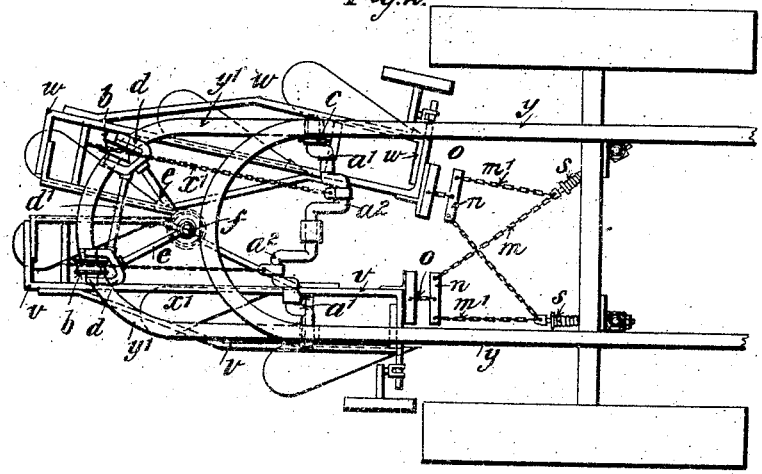
Figure 3:
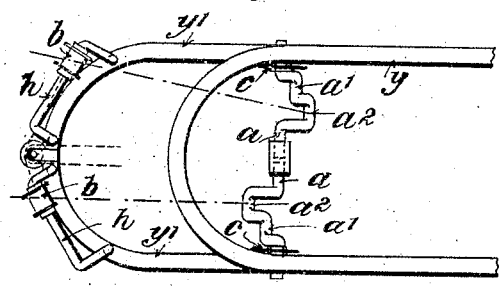

I attain these ends by suspending the two gang plows side by side in a suitable frame by flexible connections by means of which they can be raised and lowered, and by providing means whereby the said two plows can be swung laterally into and out of their working positions as shown in the accompanying drawing in which:—Figures 1 and 2 are broken views in side elevation and plan respectively showing one method of guiding the lateral swinging of the plows and Fig. 3 is a broken view in plan showing another method of effecting said guiding.

Throughout the views similar parts are marked with like letters of reference.

Referring to Figs. 1 and 2, each of the frames $v$ and $w$ of the two gang plows is suspended from the frame $z$ of the implement by two chains $x$ and $x^1$ from a four-throw crankshaft $a$ mounted in suitable bearings carried by a frame $y$ supported by suitable wheels. The cranks of the shaft $a$ are arranged in pairs $a^1$ and $a^2$, which are so set in relation to one another as to give the desired lift to the frame of the plow. Each of the chains $x$ runs direct from the crank $a^1$ to its point of attachment to the front of the frame of the plow and each of the chains $x^1$ passes over a pulley $b$ carried by a rearward extension $y^1$ of the frame $y$ of the implement before it reaches its point of attachment to the rear part of the frame of the plow. The preferred construction is to set the two cranks $a^1$ and $a^2$ at an angle of 50° or thereabouts so that on rotation of the crankshaft in the direction shown by the arrow in Fig. 1 the front share of the plow being lifted will leave the ground in advance of the rear share or shares and the front share of the plow being lowered will engage the ground in advance of the rear share or shares.

The necessary motion to lift the plows is imparted to the crankshaft $a$ by means of any suitable lifting mechanism operating through coupling gearing such as a chain and sprocket gear, of which only a sprocket wheel $c$ on the crankshaft is shown in the drawing.

Each of the pulleys $b$ is mounted to rotate in a block $d$ which is mounted to slide on the rearward extension $y^1$ of the frame $y$ of the implement, said blocks being preferably coupled together by a tie rod $d^1$ so that they move together for the purpose of bringing the plows into and out of their working positions.

As shown in Figs. 1 and 2 the gang plow $v$ is in its working position and the gang plow $w$ in its non-working position and it will be understood that when the plow $v$ is swung out of its central or working position it will occupy the same position—on its side of the frame $y$—as the plow $w$ is shown on its side of said main frame.

The sliding blocks $d$ may be shifted from one position to another by any suitable mechanism. A convenient construction is to connect the blocks by means of radius arms $e$ with a shaft $f$ mounted in suitable bearings $g$ and $g^1$ carried by the frame $y$ and the extension $y^1$, said shaft being rotated by a chain and sprocket gearing of which the sprocket wheel $f^1$ on the shaft $f$ is only shown in the drawings.

Alternatively the pulleys $b$ may each be mounted to rotate and slide independently on angularly fixed axles $h$ mounted on the extension $y^1$ of the frame $y$ as shown in Fig. 3. By this construction the tension of the chain lifting the rear end of the plow will cause the pulley $b$ over which it passes to slide axially along its axle $h$ in the direction to swing the plow automatically into its non-working position as it is lifted.

If it is desired to raise and lower the plows independently of one another the crank-shaft $a$ is made in two parts arranged in axial alinement each part having two cranks $a^1$ and $a^2$ and each fitted with independent driving mechanism.

Each gearing plow is connected to the frame $y$—preferably at or about the axis of the wheels thereof by any suitable draft tackle. A suitable one is that shown in Fig. 2 of the accompanying drawing, each of which consists of a pair of chains $m$ and $m^1$ or the like which are of unequal lengths, a whiffle-tree $n$ to the ends of which said chains are connected and a single chain $o$ or the like connecting the center of the whiffle-tree $n$ to the frame of the plow. The long chain $m$ of one tackle and the short chain $m^1$ of the other tackle are attached to the frame $y$ near to the sides thereof either directly or through a spring coupling $s$ as shown.

What I claim as my invention and desire to secure by Letters Patent is:—

1. In a plowing implement, the combination of two gang plows one right-handed and the other left-handed arranged side by side, draft tackle coupling each of said plows to the frame of the implement, means for suspending said plows from the frame of the implement, mechanism for swinging either plow into the line of draft and mechanism for raising and lowering either plow.

2. A plowing implement comprising a frame, two gang plows one right-handed and the other left-handed arranged side by side, draft tackle for coupling said plows to said frame, means for suspending said plows from the frame of the implement, mechanism for swinging one plow into its line of draft at the same time that the other plow is swung out of its line of draft.

3. A plowing implement comprising a frame, two gang plows one right-handed and the other left-handed arranged side by side, flexible draft tackle for coupling said plows to said frame, means for suspending said plows, and mechanism for lowering either plow and swinging it into its line of draft and for simultaneously raising the other plow and swinging it out of its line of draft.

4. A plowing implement comprising a frame, two gang plows one right-handed and the other left-handed arranged side by side, draft tackle coupling said plows to said frame, suspending gear for each of said plows, mechanism for lifting and lowering said plows, and mechanism whereby each plow is automatically swung into its line of draft as it is lowered and is swung out of its line of draft as it is raised.

5. A plowing implement comprising a frame; two gang plows one right-handed and the other left-handed arranged side by side in relation to said frame; mechanism for lifting and lowering said plows; means for swinging each plow into and out of its line of draft; and draft tackle for each gang plow comprising a whiffle-tree, a flexible connection between said whiffle-tree and said plow, and two chains or other flexible connections coupling said whiffle-tree to the frame of the implement, one of said chains being longer than the other the longer chain attached to one whiffle-tree and the shorter chain attached to the other whiffle-tree being attached to a common point on the frame of the implement.

6. A plowing implement comprising a frame; two gang plows one right-handed and the other left-handed arranged side by side; mechanism for lifting and lowering said plows; means for swinging each plow into and out of its line of draft; and draft tackle for the gang plows comprising a whiffle-tree connected to each plow by a flexible connection, two flexible connections—one longer than the other—coupling each of the whiffle-trees to the frame of the implement, the longer flexible connection of one whiffle-tree and the shorter flexible connection of the other whiffle-tree being attached to a common point on the frame of the tractor, and elastic couplings between said pair of connections and the frame of the implement.

7. In a plowing implement the combination of a frame $y$; a right-handed gang plow $v$; a left-handed gang plow $w$; draft tackle coupling each of said plows to the frame of the implement; lifting tackle comprising a crank-shaft $a$ having two pairs of cranks $a^1$ and $a^2$, two pulleys $b$ mounted to slide laterally in relation to the frame $y$, two chains $x$ connecting the front parts of the frames of the gang plows to the cranks $a^1$, and two chains $x^1$ connecting the rear parts of the frames of the gang plows to the cranks $a^2$ said chains $x^1$ passing over the pulleys $b$, and means for shifting the positions of the gang plows laterally in relation to the frame $y$.

8. In a plowing implement, the combination of a frame $y$; a right-handed gang plow $v$; a left-handed gang plow $w$; draft tackle between said plows and said frame; lifting tackle comprising a crank-shaft $a$ having two pairs of cranks $a^1$ and $a^2$ the cranks of each pair being set at an angle of 50°, two pulleys $b$ mounted to slide transversely in relation to the frame $y$, two chains $x$ connecting the front parts of the frames of the plows to the cranks $a^1$, and two chains $x^1$ connecting the rear parts of the frames of the plows to the cranks $a^2$ said chains $x^1$ passing over the pulleys $b$, and means for shifting the positions of the gang plows transversely in relation to the frame $y$.

9. In a plowing implement, the combination of a frame $y$; a right-handed gang plow $v$; a left-handed gang plow $w$; lifting tackle comprising a crank-shaft $a$ having two pairs of cranks $a^1$ and $a^2$, two pulleys $b$ adapted to slide transversely in relation to the frame $y$, two chains $x$ connecting the front parts of the frames of the plows to the cranks $a^1$, and two chains $x^1$ connecting the rear parts of the frames of the plows to the cranks $a^2$ said chains $x^1$ passing over the pulleys $b$; means for shifting the position of the gang plows transversely in relation to the longitudinal axis of the frame $y$; and draft tackle comprising two whiffle-trees $n$, flexible couplings $o$ connecting said whiffle-trees to the frames of the plows, and two flexible couplings $m$ and $m^1$ connecting each of said whiffle-trees to the frame of the implement one of said flexible couplings of each pair being longer than the other.

10. In a plowing implement the combination with a frame $y$; of a right-handed gang plow $v$; a left-handed gang plow $w$; flexible draft tackle connecting each of said plows to the frame $y$ of the implement; lifting and slinging tackle comprising two crank-shafts $a$ arranged in axial alinement and each having two cranks $a^1$ an $a^2$ one of each pair being set at an angle of 50° to the other, two pulleys $b$ each mounted to slide transversely in relation to the frame $y$, two chains $x$ each connecting the front part of the frame of one of the gang plows to one of the cranks $a^1$, and two chains $x^1$ each connecting the rear part of the frame of one of the gang plows to one of the cranks $a^2$ said chains $x^1$ passing over the pulleys $b$; and means for automatically shifting the positions of the pulleys $b$ transversely in relation to the longitudinal axis of the frame $y$ as said plows are raised and lowered.

FRANCIS MARK WALLER.